United States Patent [19]

Crawford et al.

[11] 3,725,576

[45] Apr. 3, 1973

[54] TELEVISION TRACKING SYSTEM
[75] Inventors: Jack A. Crawford; George R. Lewis; William H. Woodworth, all of China Lake, Calif.
[73] Assignee: The United States of America as represented by the Secretary of the Navy
[22] Filed: Sept. 12, 1962
[21] Appl. No.: 224,594

[52] U.S. Cl. .................................. 178/6.8, 244/3.16
[51] Int. Cl. .......................... F41b 7/00, G06f 15/50
[58] Field of Search .............. 178/6.8; 244/14.3, 3.16

[56] References Cited

UNITED STATES PATENTS

| 1,747,664 | 2/1930 | Droitcour | 178/6.8 |
| 2,403,975 | 7/1946 | Graham | 178/6.8 |
| 2,774,964 | 12/1956 | Baker et al. | 178/6.8 |
| 3,043,907 | 7/1962 | Martin | 178/6.8 |

Primary Examiner—Benjamin A. Borchelt
Assistant Examiner—H. A. Birmiel
Attorney—Q. B. Warner, V. C. Muller and P. H. Firsht

EXEMPLARY CLAIM

1. In a homing missile of the type steered in response to a television camera contained therein, said missile further adapted to be carried by an aircraft for launching against an assigned ground target within a scene viewed by the camera and adapted to be aimed at the target in cooperation with a television image of the scene displayed by a television viewing device contained within the aircraft, said missile and said aircraft being interconnected prior to launching through a signal relaying means for communicating electrical signals from the missiles to the aircraft, and vice versa, said signal relaying means being adapted to be disconnected upon launching, the combination, comprising;
  a. a television camera having a sighting axis and a field of view about said sighting axis and adapted to scan an image of the scene in the field of view of the camera,
  said camera being operative to produce a video signal which at each instant of said cycle of scanning motion is representative of the light-tone value of the elemental portion of the image under scan,
  said scanning means scanning said image in a predetermined cycle of scanning motion providing a predetermined trace pattern of elemental portions of said image scanned during a scan cycle,
  b. gating means operated in controlled variably timed relation to said cycle of scanning motion for defining the geometry of a missile aiming cell of area within the trace pattern and encompassing a small fraction of the total area of the raster pattern, and for passing only the video signal representative of the discrete portions of the trace pattern within said missile aiming cell, the timed relationship in which said gating means is opened being controllable to move the aiming cell between various portions of the trace pattern area, as desired.
  c. means connected to the output of the gating means and responsive to a stimulus consisting of the contrast between the intensity of the component of the gating means output video signal representing the light-tone of the assigned target, and the intensity of the component of the gating means output video signal representing the light-tone of the background surrounding the assigned target, said means being operative to generate an aiming cell positioning signal for controlling the time relation in which said gating means is opened to selectively alter the position of the cell of area to maintain said aiming cell essentially symmetrically disposed about the image of the assigned target,
  d. means for generating a missile steering signal in accordance with the displacement of said aiming cell away from a position corresponding to alignment of the aiming cell with the sighting axis of the camera,
  e. means operable after the missile is launched for steering the missile in response to said steering signal to alter the missile course in a direction tending to bring the target and the camera sighting axis into alignment to thereby steer the missile along a homing course to the target,
  whereby the missile is steered to a target by a combination of a response to the misalignment of symmetry of the aiming cell about the image of the target and a response to the misalignment of the aiming cell relative to the sighting axis of the camera, providing a dynamic range of control action permitting the missile to be controlled to steer itself to any target within the scene viewed by the camera,
  f. means responsive to the aiming cell positioning signal for generating an aiming cell image video signal for relaying same to the television viewing device in the aircraft to provide a television image representing the aiming cell,
  g. said timed relationship in which said gating means is opened further being adjustable under control of a cell position adjustment signal produced by manually operable means in the aircraft and relayed to the gating means through the interconnecting means,
  whereby the missile may be aimed to home toward any desired target in the scene displayed in the aircraft by operation of the manually operable means to bring the television image of the aiming cell into superposition with the television image of the assigned target whereupon the aiming cell will be caused to automatically track the target upon relative movement of the latter in the displayed scene and upon launching the missile will steer itself to the target.

4 Claims, 5 Drawing Figures

United States Patent [19]
Crawford et al.

[11] 3,725,576
[45] Apr. 3, 1973

INVENTORS.
JACK A. CRAWFORD
GEORGE LEWIS
WILLIAM H. WOODWORTH
BY

ATTORNEY.

TELEVISION TRACKING SYSTEM

The invention described herein may be manufactured and used by or for the Government of the United States of America for governmental purposes without the payment of any royalties thereon or therefor.

This invention relates to an automatic tracking system of the type in which the positional information regarding the object to be tracked is derived by means of a television camera.

It has been proposed that a television camera be employed as the target sensor in an automatic homing system for a missile to be delivered by an attack aircraft. This proposal has posed difficult problems in connection with providing an automatic target tracking system. Since at long ranges the target will merely be a mere "speck" in the total field of view of the camera, the target positional information should be derived from only a portion of the total field of view of the camera to minimize the likelihood of the tracking system being "decoyed" by other objects passing through such portion of the field, and to reduce the amount of background "noise" present along with the target signals. On the other hand, during the final portion of missile flight when the ratio of target movement to the range is larger, the course changes required of the missile in order to remain aligned toward the target may exceed the turning capability of the missile. Therefore, in this final portion of the flight, it is desirable that the tracking system be capable of deriving target position information for any position within the full field of view of the camera. With a television camera or the like, the target signal is derived by a transducer means sweeping the image of the target along a trace path consisting of predetermined pattern of scan or trace lines, and a number of such scan lines may pass through the target depending upon the relative size of the target. In order to maximize the range of the system it is desirable to utilize the signal energy from every scan line that passes through the target image. Also, it is desirable that the system track targets presenting both senses of contrast in the image field, that is to say, to track light targets in a dark background as well as dark targets in a light background.

Accordingly, an object of the present invention is to provide a novel automatic tracking system of the type in which positional information is derived by a television camera or the like.

Another object is to provide a tracking system in accordance with the preceding object which is capable of tracking objects regardless of the sense of contrast they present relative to their background.

Still another object is to provide a tracking system of the type referred to which utilizes signal energy presented by every scan line which passes through the image to be tracked.

A further object is to provide a tracking system of the type referred to in which (1) a very small portion of the field of view of the camera device is employed to derive the positional information, and (2) such positional information may be derived for any position of the target within the full field of view of the camera device.

Other objects, features and many of the attendant advantages of this invention will be readily appreciated as the same become better understood by reference to the following detailed description when considered in connection with the accompanying drawings wherein.

Figure 1:
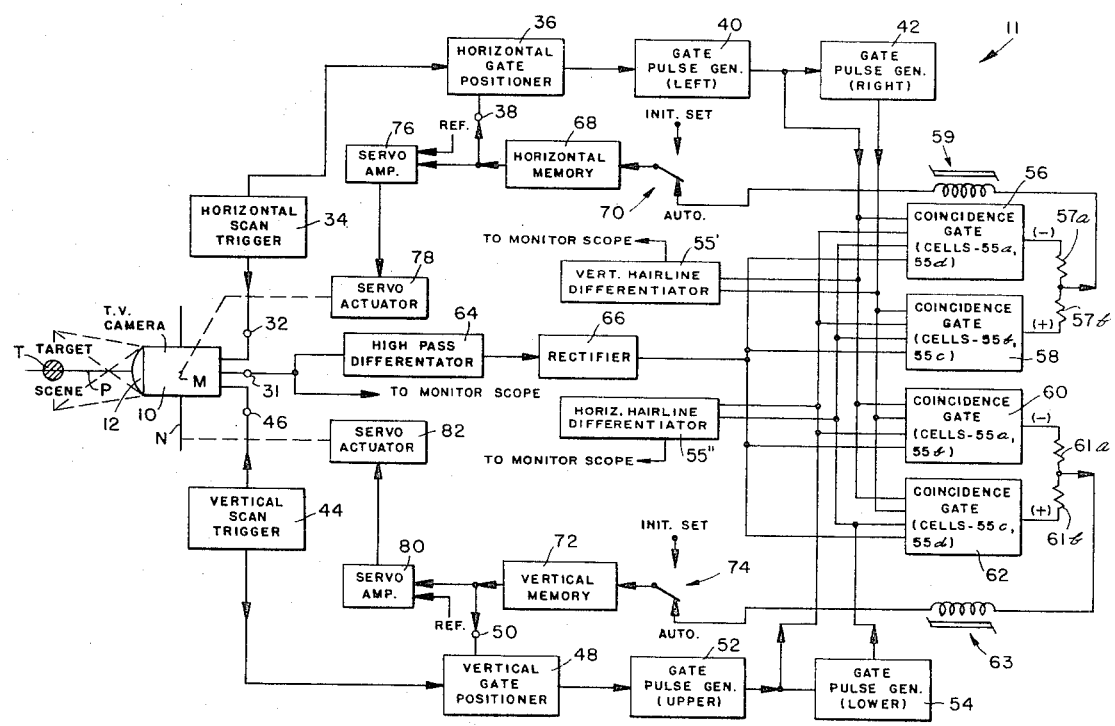
FIG. 1 is a block diagram schematic of an automatic tracking system in accordance with the present invention.
Figure 2:
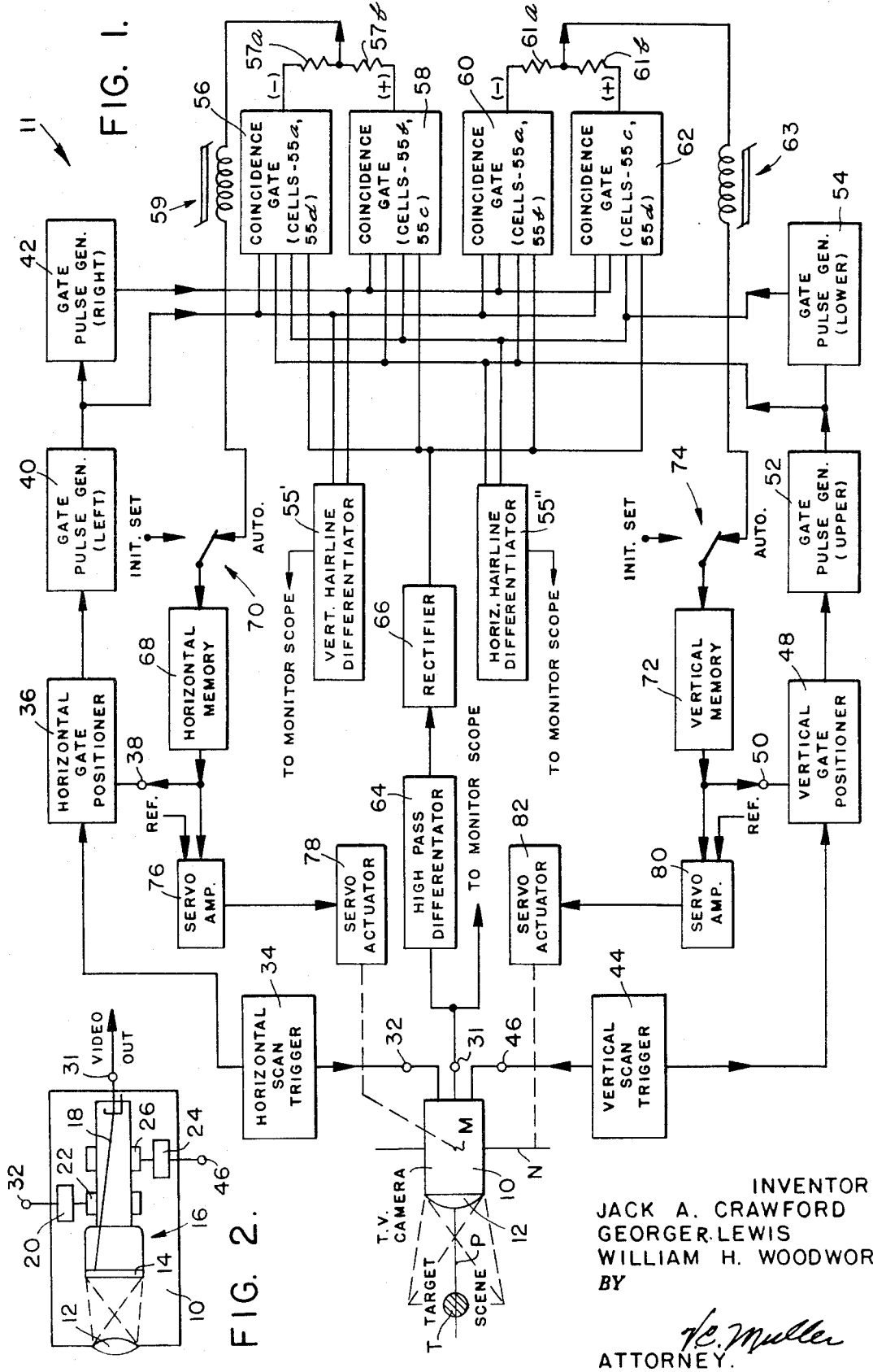
FIG. 2 is a detail of the television camera of the system of FIG. 1.
Figure 3:
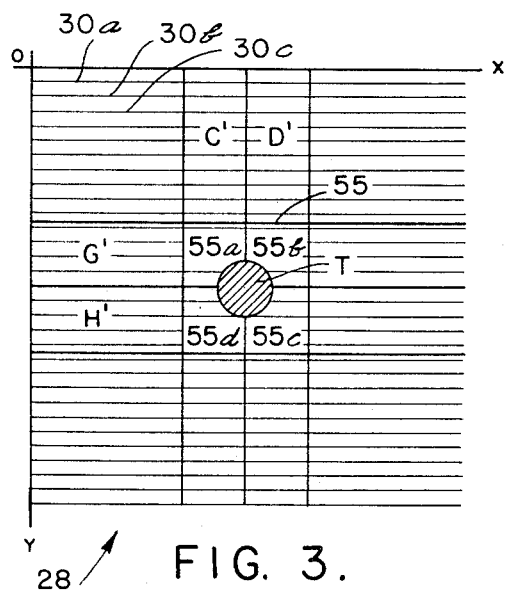
Figure 5:
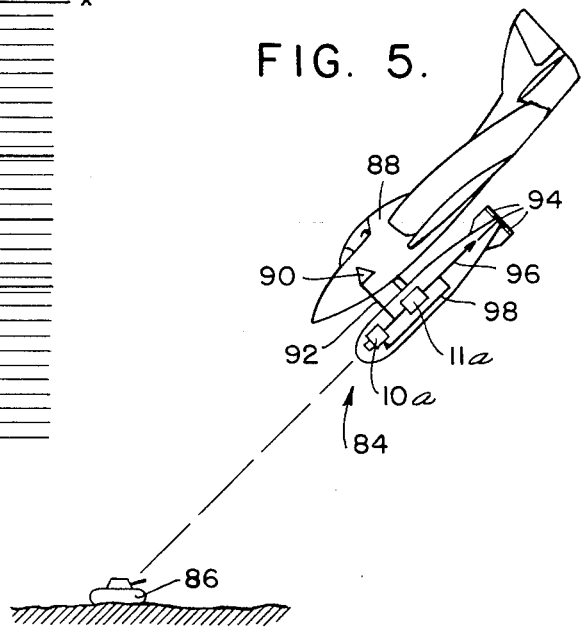
Figure 4:
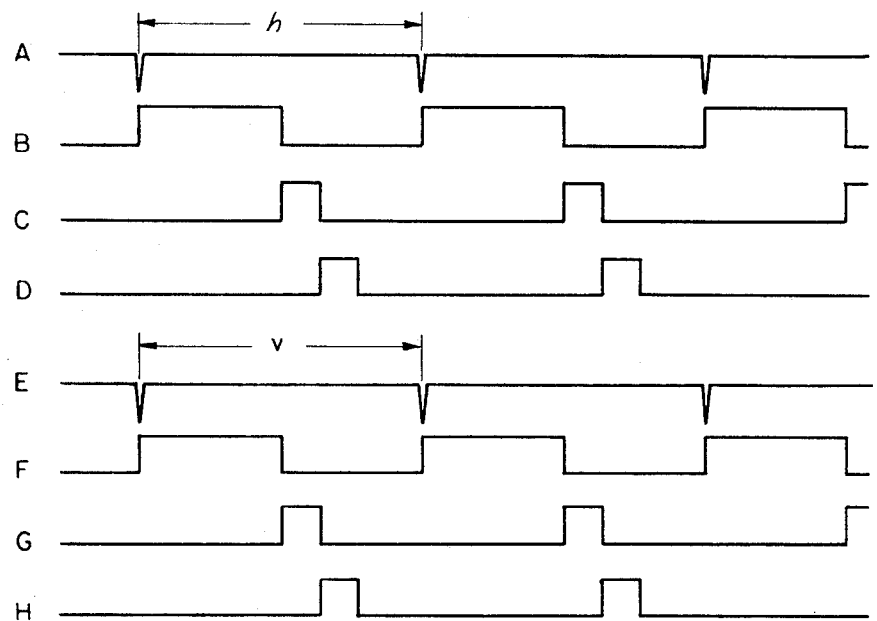

FIG. 3 diagrammatically illustrates the raster pattern of the television camera of FIG. 2 indicating portions of the raster affected by the various parts of the tracking system of FIG. 2, with such affected portions shown in an exaggerated scale;

FIG. 4 shows waveforms appearing in various portions of the system of FIG. 1, with waveforms A through D and waveforms E through H drawn to different scales; and FIG. 5 illustrates a use of the system of FIG. 1 in a guided missile launched from an attack aricraft.

Referring now to the drawings and in particular to FIG. 1, there is shown a television camera 10 mounted for movement in a horizontal plane about a vertical axis M, and for movement in a vertical plane about a horizontal axis N, and having its optical or sighting axis P directed at a target T in a scene within the field of view of the camera. In instances where the added stability is desired, the camera may be spacially stabilized by mounting it to stationary structure by means of a gyroscopically stabilized system of gimbals. The subject of the invention comprises a closed-cycle control system 11, commonly known as an automatic tracking system, by which the optical axis P is maintained directed at target T. The action of the closed cycle control system 11 is of the null type in which the system continuously operates to bring the axis into a null or zero misalignment position with respect to the target.

Turning now to FIG. 2, a lens 12 applies the image of the target scene, including the image of the target T, to a sensitive surface 14 within a conventional television camera tube 16, of any type. A beam of electrons 18, formed within tube 16 is caused to sweep or scan sensitive surface 14 in a predetermined pattern trace, commonly known as a raster, under control of a horizontal deflection generator 20 applied to the horizontal beam control means 22, and a vertical deflection generator 24 applied to a corresponding vertical beam control means 26. Each beam control means may be a conventional deflection coil or plate associated with the tube 16. FIG. 3 shows a typical raster pattern 28, having rectangular reference coordinates OX and OY, produced by generator 20 effecting rapid periodic deflection in the direction OX and by generator 24 effecting a relatively slow deflection in the direction OY. The rapid horizontal deflections produce a series of individual scan lines 30a, 30b, etc. from left to right, and the slow vertical deflection causes each of the horizontal lines of the series to be incrementally displaced along the Y axis. Typically, horizontal deflection generator 20 may deflect the beam in the direction OX at a rate of approximately 15,000 cycles per second, causing each scan line 30 to be swept in the period of 63.5 microseconds, and vertical deflection generator 24 may cause the beam to be scanned in the direction OY at a rate of approximately 60 cycles per second, causing the horizontal lines to be displaced from the top to bottom of the raster in a period of 16.7 milliseconds. The overall raster pattern is thus produced at a rate of 60 cycles per second, commonly known as the frame rate of the television camera. The retraces of the sweeps are blanked out in the conventional television manner. Thus the area of the sensitive surface 14 is orderly scanned from left to right, and top to the bottom. If desired, conventional techniques of interlacing scan during alternate raster periods may be employed to improve resolution. The electrical output signal of camera 16, commonly termed the video signal, consists of a continuous signal instantaneously proportional to the magnitudes of light-tone or image brightness of the portion of sensitive surface 14 touched by beam 18 as it scans the surface. The video signal is shown as emanating from an output terminal 31, FIGS. 1 and 2. The exact internal tube arrangement by which this signal is collected differ among the various types of available tubes and therefore has not been shown. The television camera and scan control circuit thus far described form the basic television camera system such as is employed in broadcast television and is well known.

Horizontal deflection generator 20 has a trigger input 32, and the start of each scan line 30 is initiated in response to the output signal of a horizontal scan trigger circuit 34, FIG. 1. Such output signal consists of a periodic spike signal, shown as waveform A in FIG. 4, the time interval, $h$, between spikes being generally equal to the time interval for the electron beam to sweep along a single scan line 30. Thus waveform A provides a definite reference signal coinciding with the start of each scan line 30. In many instances trigger circuit 34 may be provided as an internal component of camera 10 as means for synchronizing scanning control, instead of separate therefrom. The output of trigger circuit 34 also triggers a horizontal gate positioning circuit 36 which comprises a voltage to pulse width converter, such as the well known phantastron circuit. The output of horizontal positioner 36 consists of a pulse, shown as waveform B, having a duration between zero and time $h$, proportional to a voltage applied to an input 38 of horizontal gate positioner 36. The fall (rather than rise) of the pulse of waveform B, triggers a "left" gate pulse generator 40 to produce a relatively short fixed duration pulse, waveform C, and the fall of the pulse of waveform C triggers a "right" gate pulse generator 42 producing another short pulse of equal duration, waveform D. In a similar manner a vertical deflection trigger 44 associated with vertical deflection generator 24 produces a periodic spike signal, waveform E, with a time interval, V, between spikes equal to the vertical beam deflection time. This spiked waveform E is applied to a trigger input 46 of vertical deflection generator 24 and also to a vertical gate positioner 48 having an output pulse, waveform F, of a duration controlled by the potential at its input 50. Waveform F in turn sequentially triggers pulse waveforms G and H produced by "upper" and "lower" gate pulse generators 52 and 54.

Referring now to the FIG. 3, the occurrence of gate pulses of waveforms C and D, respectively, coincides with the periods during which electron beam 18 is directed to strips of area C' and D' of the raster pattern 28. Similarly, occurrences of the pulses of waveforms G and H, respectively, coincide with the periods of time in which electron beam 18 is directed to strips of area G' and H', respectively. Typically, the width of strips C', D', G' and H' may be one-fortieth of the raster dimension. It follows that there is a cell of tracking area 55, within which horizontal strips G' and H' and vertical strips C', D' overlay one another, the term "tracking area" being applied because it is the system action of the present invention that tracking area 55 moves relative to the raster pattern to follow or "track" an image in the target scene, as will become apparent as the description proceeds. Tracking area 55 comprises four sub-cells of area; sub-cells 55a defining the area of the raster scanned by electron beam 18 coincident with the presence of the pulses of waveforms C and G, sub-cell 55b the area coincident with the pulses of waveforms D and G, cell 55c the area coincident with pulses of waveforms D and H, and sub-cell 55d the area coincident with the pulses of waveforms C and H. Tracking area 55 is movable relative to the raster pattern under variations in voltage applied to inputs 38 and 50 of the horizontal and vertical gate positioning circuits 36 and 48, respectively. Marker signals in the form of hairlines, similar to the boundaries of strips C', D', G', H' shown in FIG. 3, may be caused to appear on a monitoring television receiver by conventional techniques of differentiating leading or trailing edges of the gate pulses by means of a suitable differentiator circuit 55' for forming the vertical hair lines, and a suitable differentiator circuit 55" for forming the horizontal hair lines, and applying such differentiated signals to the monitor scope. It is to be noted that the lines bisecting the cell in each of its rectangular dimensions form cross perpendicular hair-like reference lines.

A series of normally closed coincidence gate circuits 56, 58, 60 and 62 are provided and adapted to open during the period the scanning beam is in either of a set of two sub-cells of the tracking area as follows: gate 56 (sub-cells 55a, 55d); gate 58 (sub-cells 55b, 55c); gate 60 (sub-cells 55a, 55b); and gate 62 (sub-cells 55c, 55d). Each gate opens in response to coincidence of the pulses of waveforms C, D, G and H in accordance with the following table:

| Gate | Open during pulses |
|---|---|
| 56 (sub-cells 55a, 55d) | C and (G or H) |
| 58 (sub-cells 55b, 55c) | D and (G or H) |
| 60 (sub-cells 55a, 55b) | G and (C or D) |
| 62 (sub-cells 55c, 55d) | H and (C or D) |

As previously described, camera 10 provides at its output terminal 31 a continuous signal instantaneously proportional to the brightness of the scanned image viewed by the camera. Where the image presents itself as brightness within a dark background, a video pulse of one polarity is produced every time the electron beam sweeps across the image, with the width of such pulse proportional to the scanned width of the image. Where the image represents darkness within a bright background, a similar video pulse, but of the other polarity occurs. Thus the video signal consists of a series of video pulses, the duration, or width, of which varies in accordance with the size of the target image. Connected to the output of camera 10 is a differentiator circuit 64 having high pass frequency response characteristics. The high pass characteristic of differentiator 64 are so chosen that video pulses having a time duration equal to or less than the period required to scan across raster strips C' and D' pass without being differentiated. Thus, where the scanned width of a target is less than the width of tracking area 55, it's video signal passes unchanged, and where it is greater than the width of tracking area 55, it is differentiated.

In the case of video pulses of sufficient duration to be differentiated by differentiator 64, the output of differentiator 64 consists of pulses or peaks of positive or negative polarity depending upon the sense of contrast in brightness of the image. That is to say, the pulses will be of one polarity when the electron beam scans from dark to bright and another polarity when it scans from bright to dark. The output of differentiator 64 will then be a series of pulses having a polarity in accordance with the sense of contrast as the edge of the target is scanned. These sometimes positive and sometimes negative pulses are then fed into a fullwave rectifier 66 which converts all pulses to a common polarity regardless of the sense of contrast of the image being scanned. This common polarity series of pulses of peaks is then fed to the inputs of each of gates 56, 58, 60 and 62. Each gate is open only during the times the corresponding sub-cells of tracking frame 55 are being scanned. Over the full frame interval, the output of each gate is a measure of the area of target within the corresponding sub-cells of the gate in the case of small targets, or a measure of the contrast or rate of change of light-tone appearing in the corresponding sub-cells of the gate in the case of targets larger than target area 55.

Although the inputs of the gates are of a common polarity as hereinbefore noted, gates 56 and 58 are adapted to provide opposite polarity of output, shown as negative and positive, respectively, as by provision of a suitable inversion network in one but not the other of the gates. The negative polarity output of coincidence gate 56 is connected to one end of a summing and filter resistor 57a and the positive output of coincidence gate 58 is connected to one end of another summing and filter resistor 57b. The other ends of resistors 57a and 57b are connected by a common conductor to one end of a saturable type filtering inductor 59. The other end of saturable inductor 59 is connected to a horizontal memory circuit 68 comprising a conventional operational integrator having a capacitative feedback network.

To permit an operator to initially center the tracking area to the target, or to a target edge, a two position switch 70 is placed at the input horizontal memory 68 alternatively connecting such input to a control for initially setting the position of tracking area 55 to be manipulated by an operator, or to an automatic position in which the horizontal memory receives signals from the coincidence gate. Initially, two position switch 70 is in its initial setting position and an operator who is viewing a monitoring television screen brings tracking area 55 to the desired target. Thereafter, switch 70 is moved to its automatic position. The outputs of gates 56 and 58, which are of opposite polarities as previously mentioned, are summed by resistors 57a and 57b and applied to the input of memory 68 through saturable inductance 59. Gates 56 and 58 and summing resistors 57a, and 57b in effect compare the target area or the contrast presented by the target edge, as the case may be, within the combined area of sub-cells 55a and 55d with such area or contrast in the combined area of sub-cells 55b and 55c and produce an error signal in accordance with their difference. In the cases where the scanned width of the image of the target is less than the width of tracking area 55 and the video signal passes through differentiator 64 unchanged, the individual output of the gates cancel each other and the average combined input to memory 68 is zero when the vertical cross hair essentially bisects the area of the target. In the case where the scanned width of the image is larger than the width of the tracking area, and the video signal is differentiated by differentiator 64, the individual outputs of the gates cancel each other and the average combined input to memory 68 is zero when the "average contrast" in the halves of the cell of area to the left and right, respectively, of the vertical cross hair are equal. The expression "average contrast" denotes that the signal value is a measure of the contrast appearing in the respective halves of the tracking area, averaged over or normalized by the aggragate length of portions of the individual scan lines in each half. However, if the tracking frame is off center, the input into memory 68 will be a signal proportional to the positional difference or error of tracking area 55 relative to such central position. The output of horizontal memory 68 in turn effects the desired positioning of target area 55 by means of horizontal gate positioner 36, gate pulse generator 40, and gate pulse generator 42. Thus coincidence gates 56 and 58, resistors 57a and 57b, saturable inductor 59, horizontal memory circuit 68, horizontal gate positioner 36 and its associated left and right pulse generators 40 and 42 comprise a closed loop control circuit for moving the tracking area 55 in a horizontal direction to maintain the tracking area centered on a target, or centered on the average contrast presented by the edge of a target, depending upon whether the target has a width smaller or larger than the tracking area. If desired, the output of gates 56 and 58 may be passed through pulse stretchers having discharge times chosen to assure discharge from one raster pattern interval to the next, before being applied to the horizontal memory 68 in order to promote smoother tracking and increase the error signal magnitude.

A consideration of the described automatic closed loop tracking operation shows that the relative position of the target to the tracking area 55 is sensed at the raster frame rate, which for the typical values given is 60 times per second. Therefore, in order to insure that tracking area 55 will not move with such rapid motion that it moves beyond a small target in one sensing period, and therefore will not see the target during the next period, the relative magnitudes of the resistors 57a and 57b and the capacitance in the feedback network of the operational integrator type horizontal memory 68 are so chosen that tracking area may move no more than one-half the width of frame 55 in any sensing period. The problem in stabilizing the loop is further aggravated by a further consideration that if the tracking area moved at the rate of one-half the width of the frame in a sensing period, then with a very small target the tracking area would never come to rest, but would instead jiggle with the target first appearing in one of the right and left half portions of the target area 55 and then in the other half portion, alternating with every sensing period. To avoid this, saturable inductor 59 is so chosen that it will remain unsaturated for error signal magnitudes corresponding to little or no relative motion between the television camera line of sight and the target, but will become saturated in approximately two raster frame intervals by an error signal having a magnitude corresponding to relative movement between target and line of sight. Thus when there is little or no relative motion between the line of sight and target the inductance of saturable inductor 59 is high and therefore provides heavy filtering which stabilizes tracking action of tracking area 55. If the target moves, the error signal increases and inductor 59 saturates in approximately two raster frame intervals, henceforth allowing positioning at the maximum tracking rate because of its greatly reduced inductance. When a target crosses from one half of the tracking area to the other half of the tracking area, the inductor goes out of saturation, the filtering is heavy and the system is stable again.

In connection with tracking of a target in vertical raster directions, coincidence gates 60 and 62 are adapted to provide negative and positive polarity outputs, respectively. In the same manner as described above for horizontal tracking, coincidence gate 62, summing and filtering resistors 61a, 61b, a saturable inductor 63, a vertical memory circuit 72, and its associated two position input switch 74, vertical gate positioner 48 and upper and lower gate pulse generators 52 and 54 form a closed loop control circuit for automatically positioning tracking area 55 in vertical direction.

The automatic control action thus far described merely causes tracking area 55 to be moved to be maintained centered on the target. In order to control the angular position of television camera 10 in the horizontal plane, the output of horizontal memory circuit 68 is fed, through a suitable buffer (not shown) to the input of a conventional servo amplifier 76, where it is compared to a fixed reference signal equal to the value of memory output when the tracking area is centered in the raster pattern 28. Thus, displacement of the tracking area from the center of the raster pattern will introduce an error signal into the servo amplifier, which drives a suitable servo positioning device 78, such as a torque motor to precess the gyro of a gyro stabilized mount, or a simple servo motor and gear train, to rotate the camera about pivot axis M in the correct direction to bring the camera optical about axis P in alignment with the target and thus bring tracking area 55 to the center of the raster. In the same manner a servo system, comprising a servo-amplifier 80 having its input connected to vertical memory 72 and an associated servo positioner 82 drivingly connected to camera axis N, automatically positions camera 10 in the vertical plane.

FIG. 5 shows a specific use of the automatic track system of FIG. 1 in a homing guidance steering control of a missile 84 intended to be fired at a ground target, such as a tank 86 from an aircraft 88. Components shown in FIG. 5 which correspond to those in FIG. 1 have been assigned the same reference numeral with a suffix letter "a."

Missile 84 contains a television camera 10a that is pivotally mounted at the missile nose. Camera 10a is initially positioned with its line of sight aligned along the longitudinal axis of the missile, and is maintained in such position prior to the firing of the missile by a suitable control. The output of camera 10a is applied to a fire control television viewing scope 90 in the pilot's cockpit through a disconnectible operative connection 92. The output of camera 10a is also applied to a control system 11a. The output of control system 11a, taken at the horizontal memory and the vertical memory thereof, is converted into mechanical motion of missile control surface 94 by means of an operative connection 96, comprising a suitable feedback type automatic control system commonly called a "servo," and is also converted into mechanical movement of the pivotally mounted television camera 10a through another operative connection 98 or servo. Operative connections 96 and 98 are so chosen that after the missile is fired the control surfaces 94 are positioned to steer the missile toward target 86 and simultaneously the television camera is also positioned toward target 86, with the rate of turn of the missile at some greater multiple than the rate of turn of the television camera. Such control arrangement is known in the art as proportional navigation homing guidance. The television fire control viewing scope 90 is provided with "hairline" marker signals defining the tracking area 55, and before the missile is fired the pilot places the view of the target in his scope 90 within tracking area 55 thereof by a combination of steering the aircraft and manual control of the tracking area 55 through switches 70 and 74. When the target is within tracking area 55 the pilot may fire the missile, whereupon switches 70 and 74 are caused to change to their automatic position which permits control of the position of the camera 10a and the position of control surface 94 to be controlled by circuitry 11a. The missile will then home towards the target under the autopilot action provided by the camera and control circuitry 11a.

Obviously many modifications and variations of the present invention are possible in the light of the above teachings. For example, while the invention has been described by relation to a television camera, which is essentially a scanning station with a photo electric transducer, it will be apparent that it could employ a scanning station with other transducer means, such as infrared sensitive devices. It is therefore to be understood that within the scope of the appended claims the invention may be practiced otherwise than as specifically described.

What is claimed is:

1. In a homing missile of the type steered in response to a television camera contained therein, said missile further adapted to be carried by an aircraft for launching against an assigned ground target within a scene viewed by the camera and adapted to be aimed at the target in cooperation with a television image of the scene displayed by a television viewing device contained within the aircraft, said missile and said aircraft being interconnected prior to launching through a signal relaying means for communicating electrical signals from the missiles to the aircraft, and vice versa, said signal relaying means being adapted to be disconnected upon launching, the combination, comprising;

a. a television camera having a sighting axis and a field of view about said sighting axis and adapted to scan an image of the scene in the field of view of the camera, said camera being operative to produce a video signal which at each instant of said cycle of scanning motion is representative of the light-tone value of the elemental portion of the image under scan, said scanning means scanning said image in a predetermined cycle of scanning motion providing a predetermined trace pattern of elemental portions of said image scanned during a scan cycle, b. gating means operated in controlled variably timed relation to said cycle of scanning motion for defining the geometry of a missile aiming cell of area within the trace pattern and encompassing a small fraction of the total area of the raster pattern, and for passing only the video signal representative of the discrete portions of the trace pattern within said missile aiming cell, the timed relationship in which said gating means is opened being controllable to move the aiming cell between various portions of the trace pattern area, as desired, c. means connected to the output of the gating means and responsive to a stimulus consisting of the contrast between the intensity of the component of the gating means output video signal representing the light-tone of the assigned target, and the intensity of the component of the gating means output video signal representing the light-tone of the background surrounding the assigned target, said means being operative to generate an aiming cell positioning signal for controlling the time relation in which said gating means is opened to selectively alter the position of the cell of area to maintain said aiming cell essentially symmetrically disposed about the image of the assigned target, d. means for generating a missile steering signal in accordance with the displacement of said aiming cell away from a position corresponding to alignment of the aiming cell with the sighting axis of the camera, e. means operable after the missile is launched for steering the missile in response to said steering signal to alter the missile course in a direction tending to bring the target and the camera sighting axis into alignment to thereby steer the missile along a homing course to the target, whereby the missile is steered to a target by a combination of a response to the misalignment of symmetry of the aiming cell about the image of the target and a response to the misalignment of the aiming cell relative to the sighting axis of the camera, providing a dynamic range of control action permitting the missile to be controlled to steer itself to any target within the scene viewed by the camera, f. means responsive to the aiming cell positioning signal for generating an aiming cell image video signal for relaying same to the television viewing device in the aircraft to provide a television image representing the aiming cell, g. said timed relationship in which said gating means is opened further being adjustable under control of a cell position adjustment signal produced by manually operable means in the aircraft and relayed to the gating means through the interconnecting means, whereby the missile may be aimed to home toward any desired target in the scene displayed in the aircraft by operation of the manually operable means to bring the television image of the aiming cell into superposition with the television image of the assigned target whereupon the aiming cell will be caused to automatically track the target upon relative movement of the latter in the displayed scene and upon launching the missile will steer itself to the target.

2. In tracking apparatus for maintaining the sighting axis of a television camera directed at an assigned object within a scene viewed by the camera, the combination, comprising;

a. a television camera having a sighting axis and a field of view about said sighting axis and including scanning means adapted to scan an image of the scene in the field of view of the camera, said camera being operative to produce a video signal which at each instant is representative of the light-tone value of the corresponding elemental portion of the image under scan, said camera being of a type in which said image is scanned in a predetermined cycle of scanning motion comprising synchronous sweep motions in mutually perpendicular directions generated by corresponding high and low frequency sweep signals providing a resultant scan motion which produces a trace pattern of elemental portions of the image scanned during a scan cycle comprising a series of sequentially generated trace lines extending across the image in essentially the direction of the sweep motion corresponding to the high frequency sweep signal and disposed in sequential order in uniformly spaced relationship in the direction of sweep motion corresponding to the low frequency sweep signal, b. a pair of video gate and gate opening signal generator sets consisting of a set operated in synchronously timed relationship to the period of the high frequency sweep signal and a set operated in synchronously timed relationship to the period of the low frequency sweep signal, each set of said pair comprising a signal generator for producing first and second immediately successive gate opening signals of equal duration and in a controlled variable lagging phase relationship to the start of the corresponding sweep signal period, said equal durations of the opening signal each being a small fractional portion of the corresponding sweep signal period, a first video signal gate opened conjointly by the first of said gate opening signals produced by the signal generator of the same set and either of the first or second video signal gate opening signals produced by the signal generator of the other set, and a second video signal gate opened conjointly by the second gate opening signal generated by the signal generator of the same set and either of the first and second gate opening signals of the signal generator of the other set, to thereby define a movable rectangular tracking cell of area within the pattern of trace lines bounded by opposite cell sides in parallel and perpendicular directions to the trace lines, and to thereby define a pair of cross hair-like reference lines within the tracking cell consisting of a line which bisects the rectangular tracking cell area and is parallel to the scan lines and a line which bisects the rectangular tracking cell area and is perpendicular to the scan lines, whereby said first and second video signal gates, respectively, of the gate and generator set operated in synchronous relationship with the high frequency sweep alternately pass the video signal corresponding to those elemental portions of trace lines within the tracking cell and disposed to one and the other side, respectively, of the cross hair-like line perpendicular to the trace lines, and whereby said first and second video signal gates, respectively, of the gate and generator set operated in synchronous relationship with the low frequency sweep, alternately pass only the video signal corresponding to the portions of the trace lines within the aiming cell and disposed to one and the other side, respectively, of the cross hair-like line parallel to the scan lines, c. a first pair of means individually operatively associated with one and the other of said pair of gate and signal generator sets, each means of said first pair of means being responsive to the differential of the individual outputs of the first and second video gates of the associated gate and signal generator set to selectively vary the lagging phase relationship of its gate opening signals to maintain the tracking cell essentially symmetrically disposed about the image of the assigned object, d. a second pair of means individually operatively associated with one and the other of said pair of signal generator and gate sets, each means of said second pair producing a sighting axis misalignment signal in accordance with the difference between phase relationship of the gate opening signals of the associated set and a reference phase relationship representing the position of the cell corresponding to alignment along the camera sighting axis, and e. means for moving the line of sight axis of the camera in response to the sighting axis misalignment signals produced by said second pair of means to provide a resultant movement of the sighting axis tending to maintain the phase relationship of the gate opening signals of the respective signal generator and gate sets invarient and equal to the reference phase relationships.

3. Apparatus in accordance with claim 2, and f. a differentiator including a high frequency by-pass coupled to the output of said video camera, g. a full wave rectifier coupled to the output of said differentiator providing a unipolar video signal for application to said video gates, h. each set of said pair of gate and generator sets further including a tracking cell position memory means for defining the position of the tracking cell in the direction of motion generated by the corresponding sweep signal, said memory means being operative to produce a continuous output signal having an amplitude which changes in accordance with the magnitude of signal applied to its input and which changes in either a positive going or negative going sense of change depending upon the signal polarity of said signal applied to its input, i. each set of said pair of gate and generator sets further including means for applying the outputs of one and the other, respectively, of the first and second gates which outputs have been derived from said unipolar video signal output of the rectifier as signals of one and the other signal polarity, respectively, to the input of tracking cell position memory means of the same set, j. said differentiator and high frequency pass network being limited in its operation as a differentiator to frequencies below a high frequency limit which is generally lower than the lowest significant frequency component of a video signal corresponding to an image having a width in the direction of the scan lines or larger than the width of the tracking cell in the direction of the scan lines, whereby said first pair of means maintains the tracking cell disposed about the image of the target with the essentially equal areas of the target disposed to one and the other side of the respective cross hair lines, for target having an image generally smaller than the tracking cell, and whereby said first pair of means maintains the tracking cell disposed about a loci of the target image essentially along its edge at which the average contrast of the portion of the image of target and of the image of the portion of the scene adjacent the target, within the cell, is equal in halves of the cell to one and the other sides of the respective cross hair-like lines, for targets having images generally larger than the tracking cell.

4. Apparatus in accordance with claim 3, k. said signals from the first and second gates, respectively, being applied to a common junction point through corresponding filter resistors, and thence to the input of the tracking cell position memory means through a saturable filtering inductor having a saturation threshold so chosen to obviate undesired hunting effects consisting of alternation of the cross hair line parallel to the scan line to one and the other side of the image of a small target during successive period of the low frequency sweep.

* * * * *